US010803027B1

United States Patent
Rodgers et al.

(10) Patent No.: US 10,803,027 B1
(45) Date of Patent: Oct. 13, 2020

(54) METHOD AND SYSTEM FOR MANAGING FILE SYSTEM ACCESS AND INTERACTION

(71) Applicant: Cisco Technology, Inc., San Jose, CA (US)

(72) Inventors: Robert Stephen Rodgers, Mountain View, CA (US); William Norman Eatherton, San Jose, CA (US); Michael John Beesley, Atherton, CA (US); Stefan Alexander Dyckerhoff, Palo Alto, CA (US); Philippe Gilbert Lacroute, Sunnyvale, CA (US); Edward Ronald Swierk, Mountain View, CA (US); Neil Vincent Geraghty, San Francisco, CA (US); Keith Eric Holleman, Campbell, CA (US); Thomas John Giuli, Mountain View, CA (US); Srivatsan Rajagopal, Cupertino, CA (US); Paul Edward Fraley, Sunnyvale, CA (US); Vijay Krishnaji Tapaskar, Palo Alto, CA (US); Daniel Sergeevich Selifonov, Mountain View, CA (US); Keith Anthony Low, San Mateo, CA (US)

(73) Assignee: Cisco Technology, Inc., San Jose, CA (US)

( * ) Notice: Subject to any disclaimer, the term of this patent is extended or adjusted under 35 U.S.C. 154(b) by 778 days.

(21) Appl. No.: 14/705,539

(22) Filed: May 6, 2015

Related U.S. Application Data

(60) Provisional application No. 61/989,957, filed on May 7, 2014.

(51) Int. Cl.
*G06F 16/00* (2019.01)
*G06F 16/188* (2019.01)
*G06F 9/455* (2018.01)
*G06F 21/62* (2013.01)

(52) U.S. Cl.
CPC ........ *G06F 16/196* (2019.01); *G06F 9/45533* (2013.01); *G06F 21/6218* (2013.01)

(58) Field of Classification Search
CPC ......... G06F 17/30194; G06F 17/30067; G06F 17/30238; G06F 17/30952; G06F 17/30; G06F 21/6218; G06F 3/0635; G06F 9/45533
See application file for complete search history.

(56) References Cited

U.S. PATENT DOCUMENTS

| 6,219,786 B1 * | 4/2001 | Cunningham | .......... H04L 43/00 709/229 |
|---|---|---|---|
| 7,870,153 B2 | 1/2011 | Croft et al. | |
| 7,886,023 B1 | 2/2011 | Johnson | |

(Continued)

OTHER PUBLICATIONS

Office Action issued in related U.S. Appl. No. 14/705,589, dated Dec. 29, 2016 (29 pages).

*Primary Examiner* — Diedra McQuitery

(57) ABSTRACT

In general, embodiments of the invention relate managing the interaction of applications with one or more file systems and/or data managed by the file systems. More specifically, embodiments of the invention relate to providing applications with access to an overlay file system (OFS) and then servicing OFS operations using a file system module and one or more underlay file systems (UFSes) that are not directly accessible to the applications.

20 Claims, 8 Drawing Sheets

(56) References Cited

U.S. PATENT DOCUMENTS

| | | |
|---|---|---|
| 8,010,679 B2 | 8/2011 | Low et al. |
| 8,051,180 B2 | 11/2011 | Mazzaferri |
| 8,166,261 B1 | 4/2012 | Cremelie et al. |
| 8,218,828 B2 | 7/2012 | Iasso |
| 8,438,654 B1 | 5/2013 | von Eicken et al. |
| 8,572,400 B2 | 10/2013 | Lin et al. |
| 8,588,233 B1 | 11/2013 | Lohner et al. |
| 8,607,054 B2 | 12/2013 | Ramarathinam et al. |
| 8,661,252 B2 | 2/2014 | Chandwani |
| 8,800,009 B1* | 8/2014 | Beda, III ............ H04L 63/0846 713/155 |
| 8,959,108 B2 | 2/2015 | Pereira et al. |
| 9,495,379 B2 | 11/2016 | Zhang et al. |
| 2003/0212779 A1 | 11/2003 | Boyter et al. |
| 2005/0055456 A1 | 3/2005 | Chalupsky et al. |
| 2005/0102297 A1* | 5/2005 | Lloyd ................ H04L 29/12132 |
| 2007/0055703 A1* | 3/2007 | Zimran ............. H04L 29/12594 |
| 2007/0107046 A1 | 5/2007 | Jaeger et al. |
| 2007/0233698 A1 | 10/2007 | Sundar et al. |
| 2009/0063538 A1 | 3/2009 | Chitrapura et al. |
| 2009/0248786 A1 | 10/2009 | Richardson et al. |
| 2010/0058468 A1 | 3/2010 | Green et al. |
| 2010/0088367 A1 | 4/2010 | Brown et al. |
| 2010/0088405 A1 | 4/2010 | Huang et al. |
| 2010/0257578 A1* | 10/2010 | Shukla ................ G06F 21/6218 726/1 |
| 2011/0072505 A1 | 3/2011 | Ott |
| 2011/0125894 A1* | 5/2011 | Anderson ............ H04L 9/3213 709/224 |
| 2011/0162042 A1 | 6/2011 | Xiao et al. |
| 2012/0066582 A1 | 3/2012 | Scoda et al. |
| 2012/0117229 A1* | 5/2012 | Van Biljon ............ G06Q 30/04 709/224 |
| 2012/0151209 A1 | 6/2012 | Visnyak et al. |
| 2013/0185715 A1 | 7/2013 | Dunning et al. |
| 2013/0205376 A1 | 8/2013 | Narasimha et al. |
| 2013/0238808 A1 | 9/2013 | Hallem et al. |
| 2013/0262801 A1* | 10/2013 | Sancheti ................ G06F 3/065 711/162 |
| 2014/0101113 A1 | 4/2014 | Zhang et al. |
| 2014/0123055 A1* | 5/2014 | Krleza ................ G06F 16/248 715/780 |
| 2014/0165147 A1 | 6/2014 | Hershberg et al. |
| 2014/0189808 A1 | 7/2014 | Mahaffey et al. |
| 2014/0281500 A1 | 9/2014 | Ignatchenko |
| 2014/0297779 A1 | 10/2014 | Pack et al. |
| 2014/0337914 A1* | 11/2014 | Canning ................ H04L 63/10 726/1 |
| 2014/0344475 A1 | 11/2014 | Chen et al. |
| 2015/0007250 A1 | 1/2015 | Dicato, Jr. et al. |
| 2015/0100887 A1 | 4/2015 | Verkasalo |
| 2015/0161282 A1 | 6/2015 | Low et al. |
| 2015/0215308 A1 | 7/2015 | Manolov et al. |
| 2015/0254451 A1 | 9/2015 | Doane et al. |
| 2016/0004859 A1 | 1/2016 | Goodes et al. |
| 2016/0021055 A1 | 1/2016 | Krzywonos et al. |
| 2016/0119365 A1 | 4/2016 | Barel |
| 2016/0127407 A1 | 5/2016 | Mankovskii et al. |

* cited by examiner

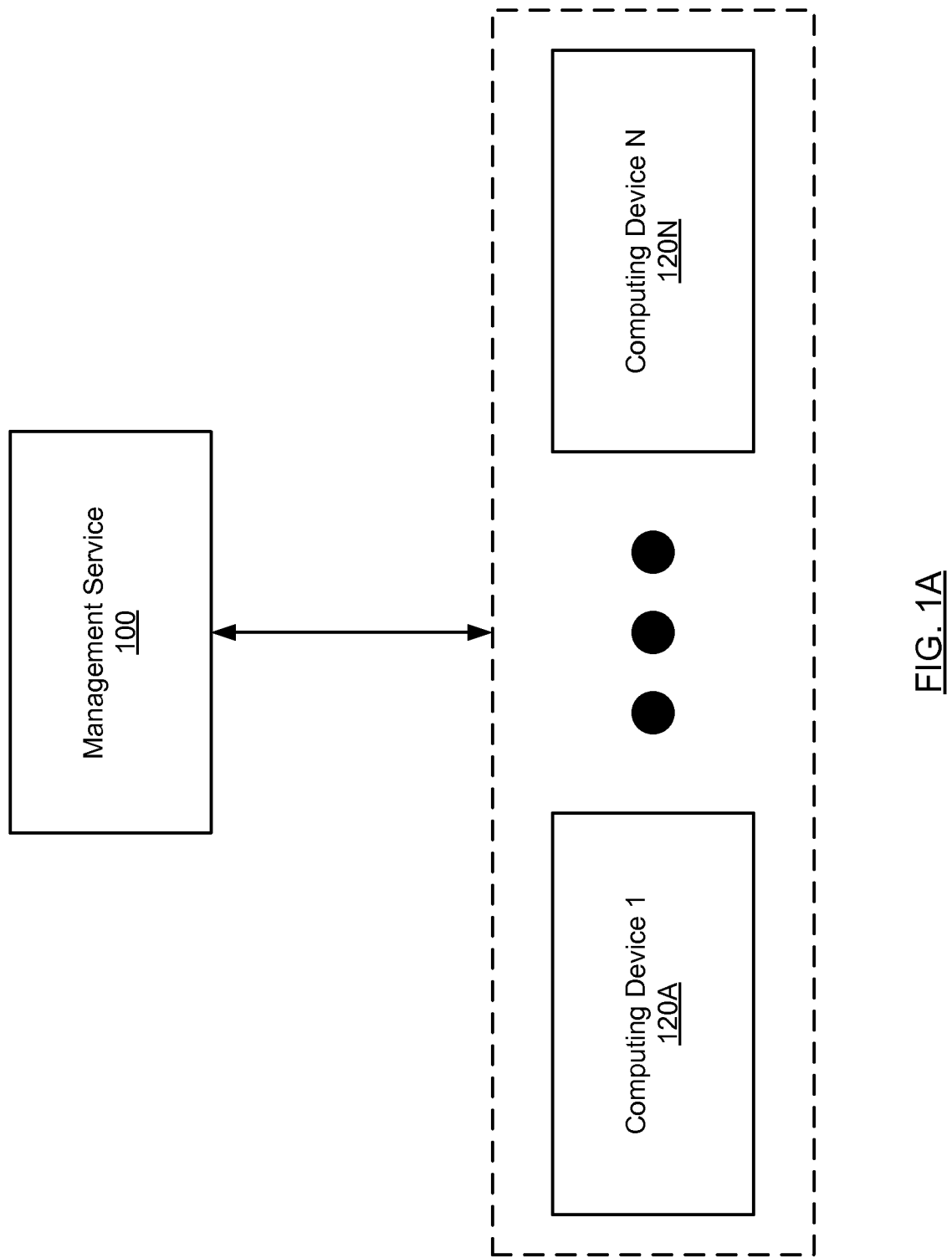

METHOD AND SYSTEM FOR MANAGING FILE SYSTEM ACCESS AND INTERACTION

CROSS-REFERENCE TO RELATED APPLICATIONS

This application claims priority to U.S. Provisional Patent Application No. 61/989,957 filed May 7, 2014, the entire disclosure of which is hereby expressly incorporated by reference herein.

BACKGROUND

Software applications may include functionality to access data via file systems. If a software application is compromised then an attacker may, via the compromised software application, access stored data via the file system.

SUMMARY

In general, in one aspect, the invention relates to a method for processing overlay file system (OFS) operations by a file system module, the method comprising receiving an OFS operation, wherein the OFS operation comprises a trigger event, and an OFS path, and an OFS username, wherein the OFS operation is issued by an application, translating the OFS path to an underlay file system (UFS) path, translating the OFS user to a UFS username, identifying a conditional filter that matches a tuple comprising the OFS path, the UFS path, a UFS username, and the trigger event, obtaining a policy using the conditional filter, applying the policy to the OFS operation in order to generate a response, and providing the response to the application, wherein the application is executing in application virtual machine (AVM), wherein the file system module is executing in a service virtual machine (SVM), wherein the OFS comprises an OFS client and an OFS server, wherein the OFS client is executing in the AVM and the OFS server is executing in the SVM, wherein the SVM and the AVM are located in a computing device.

In general, in one aspect, the invention relates to a non-transitory computer readable medium comprising computer readable program code, which when executed by a computer processor enables the computer processor to perform a method for processing overlay file system (OFS) operations by a file system module, the method comprising receiving an OFS operation, wherein the OFS operation comprises a trigger event, and an OFS path, and an OFS username, wherein the OFS operation is issued by an application, translating the OFS path to an underlay file system (UFS) path, translating the OFS user to a UFS username, identifying a conditional filter that matches a tuple comprising the OFS path, the UFS path, a UFS username, and the trigger event, obtaining a policy using the conditional filter, applying the policy to the OFS operation in order to generate a response, and providing the response to the application, wherein the application is executing in application virtual machine (AVM), wherein the file system module is executing in a service virtual machine (SVM), wherein the OFS comprises an OFS client and an OFS server, wherein the OFS client is executing in the AVM and the OFS server is executing in the SVM, wherein the SVM and the AVM are located in a computing device.

Other aspects of the invention will be apparent from the following description and the appended claims.

BRIEF DESCRIPTION OF DRAWINGS

FIGS. 1A-1C show systems in accordance with one or more embodiments of the invention.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1A-6, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate managing the interaction of applications with one or more file systems and/or data (typically in the form of data and metadata) managed by the file systems. More specifically, embodiments of the invention relate to providing applications with access to an overlay file system (OFS) and then servicing OFS operations using a file system module and one or more underlay file systems (UFSes) that are not directly accessible to the applications. In one or more embodiments of the invention, the isolation of the UFSes and the file system module from an application may provide an additional layer of security to the data managed by the UFSes in the event that the application is compromised. Further, the file system module may also apply various actions (at varying levels of complexity) in response to OFS operations received from an application. Additional detail about the OFSes, file system module, and the UFSes is described below with respect to FIGS. 4-6.

Figure 1B:
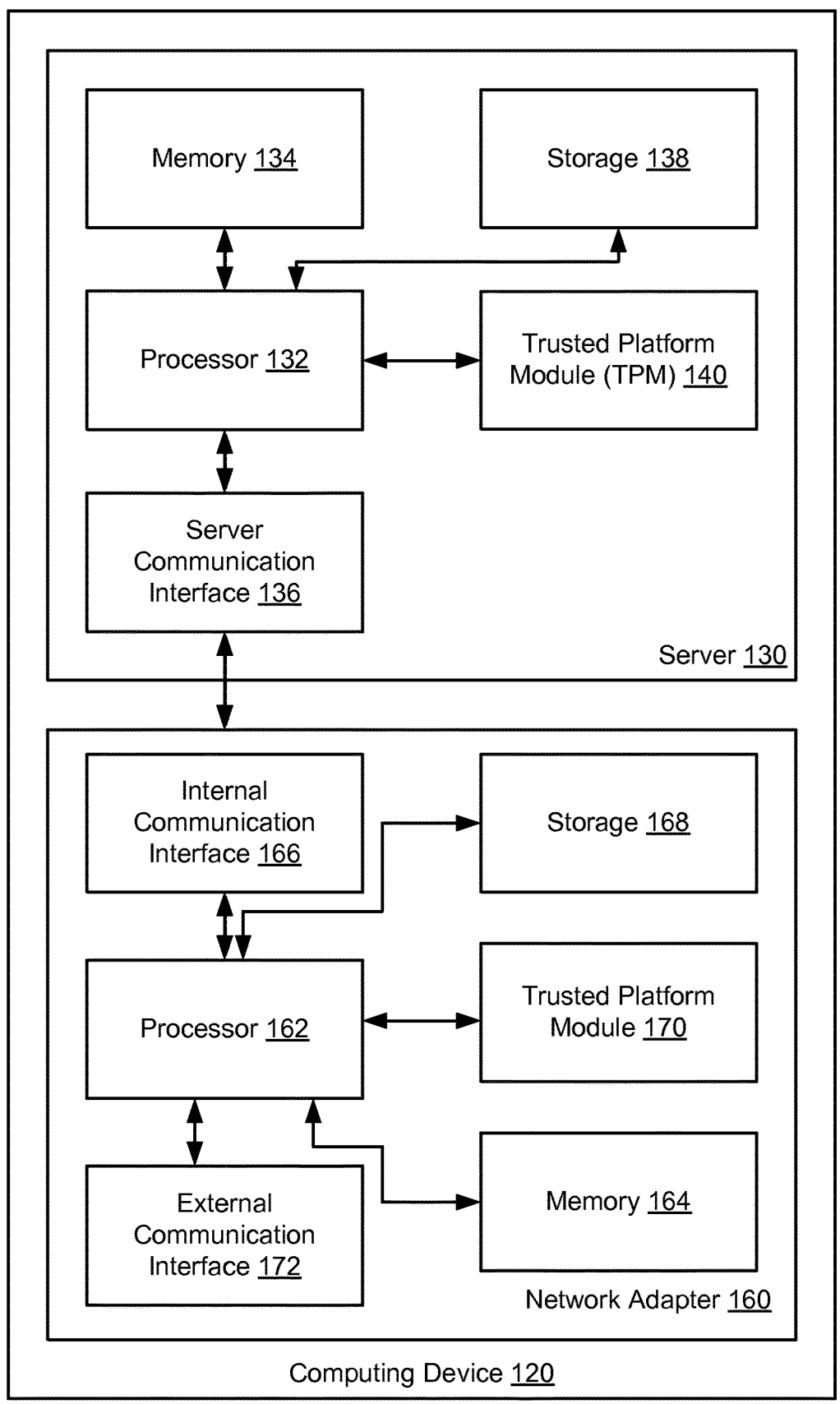

FIG. 1A shows a system in accordance with one or more embodiments of the invention. The system includes computing devices (120A-120N) (described, e.g., in FIGS. 1B-1C) operatively connected to a management service (100). In one embodiment of the invention, the management service (100) is any combination of hardware and software that includes functionality to manage one or more computing devices. More specifically, the management service (100) may include one or more servers (each including at least a processor, memory, persistent storage, and a communication interface) executing one or more applications (not shown) that include functionality to manage the computing devices (120A, 120N). The management of the computing devices by the management service may include, but is not limited to, functionality to: configure the computing device, modify the configuration (or operation of) the computing device, verify the integrity of the computing devices (i.e., to determine whether there has been any tampering (of the software and/or hardware) of the computing device), receive data from and/or provide data to the computing devices, provide applications to the computing device, and provide functionality to implement various methods described below (see e.g., FIG. 5-6).

The management service may communicate with the computing device(s) using any combination of wired and/or wireless communication protocols. Further, the management service may communicate with the management service via a local area network (e.g., an enterprise network, and/or wide area network (e.g., over the Internet)). The communication between the management service and the computing devices may include any combination of secured (e.g., encrypted) and non-secure (e.g., un-encrypted) communication channels. In one or more embodiments of the invention, secure communication is ensured, even in case of a non-secure communication channel. The manner in which the management service and the computing devices communicate may vary based on the implementation of the invention.

In one embodiment of the invention, the computing devices (120A, 120N) may be located within an enterprise. More specifically, the computing devices may be on an enterprise network (i.e., behind the enterprise's firewall).

The management service and one or more of the computing devices may be located in the same physical location (e.g., in the same data center). Alternatively, the management service and one or more of the computing devices may be located in different physical locations. The physical locations of the management service and the computing devices may vary based on the implementation.

As discussed above, the management service includes functionality to verify the integrity of the computing devices. The aforementioned verification may be performed whenever the computing device is powered on, restarted, etc. and at any other point at which the management service determines it is necessary (e.g., based on a policy implemented by the management service) to verify the integrity of the computing device.

The following is an example of the integrity verification performed by the management service when a computing device is powered on. The example is not intended to limit the invention. Turning to the example, consider a scenario in which a computing device is configured and then subsequently shipped to a user to be installed into their enterprise network. Once the computing device has been installed in the enterprise network, the computing device is powered on and the integrity verification for the computing device is initiated. In this example, through the integrity verification processes, the computing device needs to provide to the management service serial numbers (or other identification numbers) for one or more hardware components (see e.g., FIG. 1B) in the computing device) and perform a series of integrity measurements of the software that is present on the computing device (e.g., the BIOS, executable code in the ROM, platform and motherboard configuration data, operating system software, virtualization software, applications, etc.). In one embodiment of the invention, each of the integrity measurements is a cryptographic hash (e.g., SHA-256 hash) of the software being measured. The integrity measurements may be obtained in accordance with one or more Trusted Computing Group Trusted Platform Module specifications. Other methods for performing integrity measurements may be implemented without departing from the invention.

Returning to the example, once the serial numbers and the integrity measurements are provided to the management service, the management service verifies the aforementioned information. If the verification is successful, then the integrity of the computing device has been verified. At this point, the management service may permit the computing device to complete the boot process. More specifically, in one embodiment of the invention, the computing device's functionality may be limited until its integrity has been successfully verified. Accordingly, prior to successful verification, the computing device may only perform the functions that are required to enable its integrity verification. All other functionality may be disabled, e.g., the computing device cannot execute any other operating system or applications, the computing device cannot communicate with any other remote system except the management service, etc.

Continuing with the discussion of FIG. 1A, in one embodiment of the invention, each of the computing devices includes functionality to execute one or more applications (discussed below, see e.g., FIG. 1C). Further, each of the computing devices may include functionality to interact with other computing devices, the management service, and/or other systems (i.e., systems that are operatively connected to the computing device).

FIG. 1B shows a system in accordance with one or more embodiments of the invention. In one or more embodiments of the invention, computing device (120) includes two components: a server (130) and a network adapter (160). Each of these components is described below.

Figure 1C:
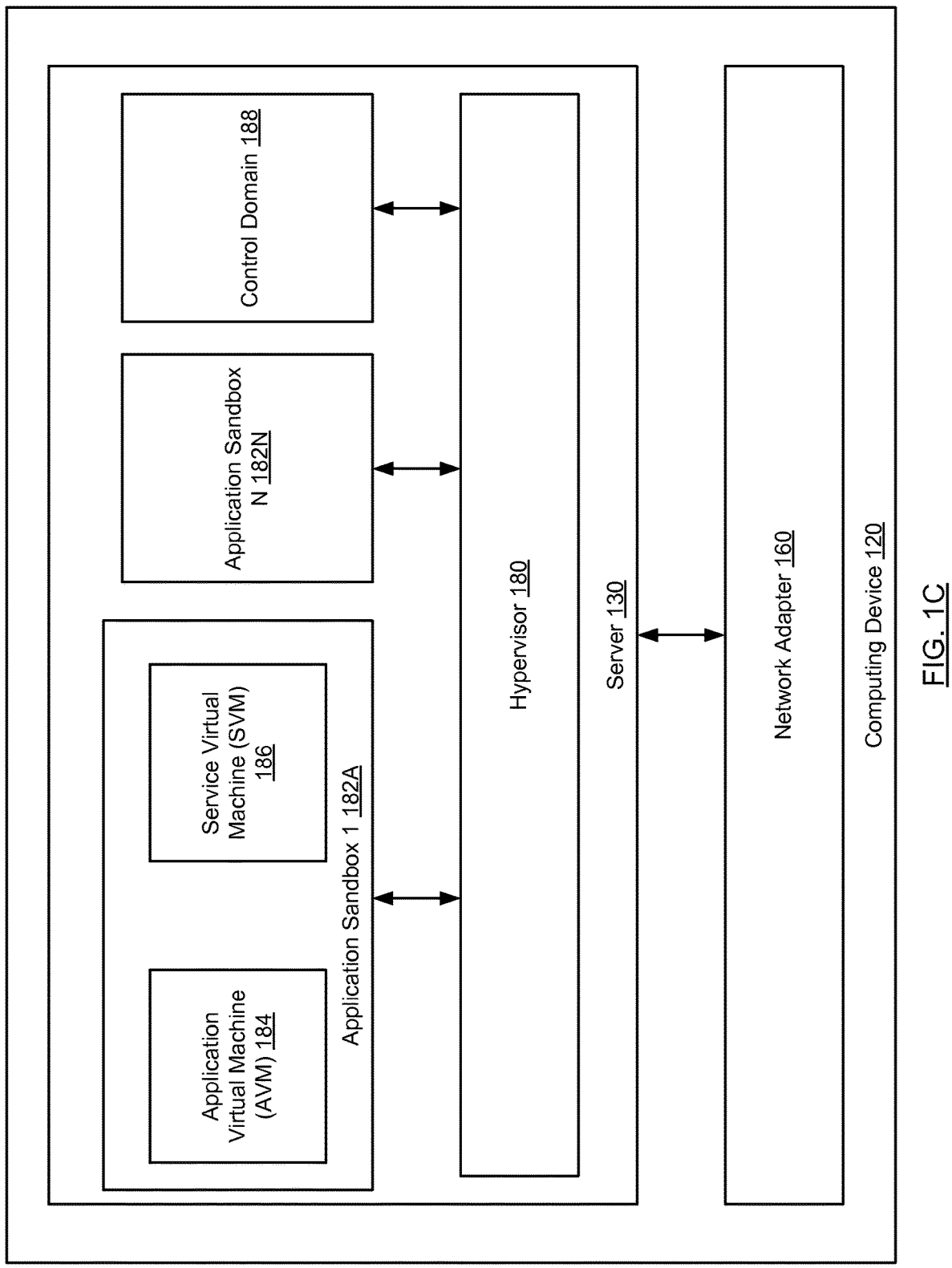

In one embodiment of the invention, the server (130) may include functionality to execute applications, virtual machines, and one or more operating systems (see e.g., FIG. 1C). The server (130) may include a processor (132), memory (134), a server communication interface (136), storage (138), and a trusted platform module (140). Each of these components is described below.

In one embodiment of the invention, the processor (132) is a group of electronic circuits with a single core or multi-cores that are configured to execute instructions. In one embodiment of the invention, the processor may be implemented using a Complex Instruction Set (CISC) Architecture or a Reduced Instruction Set (RISC) Architecture In one embodiment of the invention, the memory (134) corresponds to any volatile memory including, but not limited to, Dynamic Random-Access Memory (DRAM), Synchronous DRAM, SDR SDRAM, and DDR SDRAM.

In one embodiment of the invention, the server communication interface (136) enables communication between the server (130) and the network adapter (160). The server communication interface may provide the only path through which the server and the network adapter may communicate. Accordingly, the server may not directly access any other component of the network adapter (160). The server communication interface (136) may use any of the following protocols to communicate with the network adapter: Peripheral Component Interconnect (PCI), PCI-Express (PCIe), and PCI-eXtended (PCI-X), Non-Volatile Memory Express (NVMe). Those skilled in the art will appreciate that the invention is not limited to the aforementioned protocols.

In one embodiment of the invention, the storage (138) corresponds to any persistent (non-volatile storage). The storage (138) may include any combination of the following: magnetic storage, optical storage, NAND Flash memory, NOR Flash memory, Magnetic RAM Memory (M-RAM), Spin Torque Magnetic RAM Memory (ST-MRAM), Phase Change Memory (PCM), memristive memory, or any other memory defined as a non-volatile Storage Class Memory (SCM). Those skilled in the art will appreciate that embodiments of the invention are not limited to aforementioned types of storage.

In one embodiment of the invention, the trusted platform module (140) (which may also be referred to as hardware security module) is a microprocessor that includes a cryptographic processor, a secure input/output (I/O) interface, persistent memory (which may store various cryptographic keys), and volatile memory (which may store integrity measurements and cryptographic keys). In one embodiment of the invention, the cryptographic processor may include functionality to encrypt and decrypt data, generate random numbers, generate cryptographic keys (e.g., public-private key pairs, symmetric keys, etc.), and generate hash values (e.g., using SHA-256). The trusted platform module may be implemented in a manner that conforms to one or more Trusted Computing Group Trusted Platform Module specifications.

In one embodiment of the invention, the network adapter (160) includes functionality to control and/or provide network access between the server and other entities that are external to the computing device (e.g., other computing devices, the management services, and other systems (described above)). The network adapter may also include functionality to control the server's hardware resets and boot behavior. The network adapter (160) may include a processor (162), memory (164), an internal communication interface (166), storage (168), a trusted platform module (170), and an external communication interface (172). Each of these components is described below.

In one embodiment of the invention, the processor (162) is a group of electronic circuits with a single core or multi-cores that are configured to execute instructions. In one embodiment of the invention, the processor may be implemented using a Complex Instruction Set (CISC) Architecture or a Reduced Instruction Set (RISC) Architecture In one embodiment of the invention, the memory (164) corresponds any volatile memory including, but not limited to, Dynamic Random-Access Memory (DRAM), Synchronous DRAM, SDR SDRAM, and DDR SDRAM.

In one embodiment of the invention, the internal communication interface (166) enables communication between the server (130) and the network adapter (160). The internal communication interface may provide the only path through which the server and the network adapter may communicate. Accordingly, all communication from the server (130) and to the server (130) passes through the internal communication interface (166) The internal communication interface (166) may use any of the following protocols to communicate with the network adapter: Peripheral Component Interconnect (PCI), PCI-Express (PCIe), and PCI-eXtended (PCI-X), Non-Volatile Memory Express (NVMe). Those skilled in the art will appreciate that the invention is not limited to the aforementioned protocols.

In one embodiment of the invention, the storage (168) corresponds to any persistent (non-volatile storage). The storage (168) may include any combination of the following: magnetic storage, optical storage, NAND Flash memory, NOR Flash memory, Magnetic RAM Memory (M-RAM), Spin Torque Magnetic RAM Memory (ST-MRAM), Phase Change Memory (PCM), memristive memory, or any other memory defined as a non-volatile Storage Class Memory (SCM). Those skilled in the art will appreciate that embodiments of the invention are not limited to aforementioned types of storage.

In one embodiment of the invention, the trusted platform module (170) (which may also be referred to as hardware security module) is the same or substantially similar to the TPM (140) described above.

In one embodiment of the invention, the external communication interface (172) enables the computing device (120) to communicate with the management service, other computing devices, or other systems (described above). The external communication interface may be implemented in accordance with the Ethernet standard (i.e., the external communication interface may include one or more Ethernet ports). Other communication standards may be used without departing from the invention.

In one embodiment of the invention, the network adapter (160) may include functionality to implement various secure communication protocols such as Internet Protocol Security (IPSec), Secure Sockets Layer (SSL), and Transport Layer Security (TLS). Further, the network adapter (160) may include functionality to perform various cryptographic functions on behalf of the server (or processes executing therein). For example, the network adapter (160) may include one or more FPGAs, one or more ASICs, etc. that that may be used to perform encryption and decryption functions on behalf of the processes executing in the server.

As discussed above, the computing devices include functionality to obtain integrity measurements that are used by the management service in order to verify the integrity of the computing device. In one embodiment of the invention, the server (using TPM (150)) and the network adapter (using TPM (170)) are each responsible for obtaining integrity measurements for the software executing therein. The management service, upon receiving the aforementioned measurements, may then verify the integrity of the server and network adapter independently. Further, the management service may only permit applications and virtual machines to execute on the computing devices if both the integrity of the server (130) and the integrity of the network adapter (160) have been verified. In certain scenarios, if the integrity of either the network adapter or the server cannot be verified, then the computing device may cease operating (or initiate some other remedial action).

In one embodiment of the invention, the network adapter may limit the server's use of the external communication interface (172) until the server's integrity has been verified. In such scenarios, the server (130) may only be able to access the management service via the external communication interface until the integrity of the server has been verified.

FIG. 1C shows a logical view of the computing device in accordance with one or more embodiments of invention. As shown in FIG. 1C and previously discussed, the computing device includes a server (130) and a network adapter (160). Further, the server (130) may have thereon one or more of the following components: a hypervisor (180), a control domain (188), and one or more application sandboxes (182A, 182N). Each of these components is described below.

In one embodiment of the invention, the control domain (188) is a virtual machine that includes an operating system (e.g., Security-Enhanced Linux). The control domain provides an isolated execution environment for processes/services executing within the control domain. The control domain (via the services executing therein) manages other virtual machines (discussed above) executing on the server (130). Management of the virtual machines may include, but is not limited to, instantiating virtual machines, halting execution of virtual machines on the server, providing various services to virtual machines (e.g., key management, backend processing of various protocol proxies executing in the service virtual machines (discussed below), etc.), and obtaining and enforcing policies related to the operation of the virtual machines in one or more application sandboxes.

In one embodiment of the invention, an application sandbox (182A, 182) includes one or more service virtual machines (SVM) (186) and one or more application virtual machines (AVMs) (184). Each of the SVMs and the AVMs is an isolated executing environment that includes its own operating system (e.g., Linux, Security-Enhanced Linux, or Windows). In embodiment of the invention, each AVM is associated with one SVM but each SVM may be associated with multiple AVMs. Each AVM includes functionality to execute one or more applications (including $3^{rd}$ party applications). In one embodiment of the invention, the applications and/or processes executing within the AVM are only able to directly communicate with the associated SVM. The SVM may, based on one or more policies, permit the applications and/or processes within the AVM to access resources (software resources and/or hardware resources) in the server and/or the network adapter. In other embodiments of the invention, certain applications and/or processes in the AVM may (in certain scenarios) directly access resources in the server and/or network adapter. In such cases, the system may implement a policy which dictates when the applications/processes in an AVM can directly access the resources in the server and/or the network adapter and when the applications/processes are required to communicate with the SVM, which in turn communicates with the resources on the server and/or network adapter.

Continuing with the discussion of FIG. 1C, the SVM includes functionality to provide various services to the associated AVMs. These services may include, but are not limited to, various network services such as DHCP, ARP, DNS, and various file system services (i.e., services to access data that is external to the AVM). The services provided by the SVM to the AVM may be implemented as proxy services within the SVM. More specifically, from the perspective of the AVM, the proxy services provided by the SVM are the actual services. However, the proxy services provided by the SVM may be modified versions of the actual services, where the modification to the actual services may include modifications that limit access to the actual services or change the behavior of the actual services. In one embodiment of the invention, the control domain may perform various levels of processing to assist the SVM in implementing one or more proxy services. For example, in certain scenarios the proxy service is completely implemented in the SVM while in other scenarios a portion of the proxy service is implemented in the SVM while another portion of the proxy service is implemented in the control domain. The SVM may also implement various applications/processing that may or may not be considered proxy services (see e.g., FIG. 4-6)

In one embodiment of the invention, the hypervisor (180) provides the interface between the hardware resources on the server (see e.g., FIG. 1B) and the virtual machines (e.g., control domain, SVMs, AVMs, etc.) executing on the server.

The hypervisor executing on the server (130) may be, for example, a Xen hypervisor, a kernel-based virtual machine (KVM), or VMware ESXi.

Figure 2:
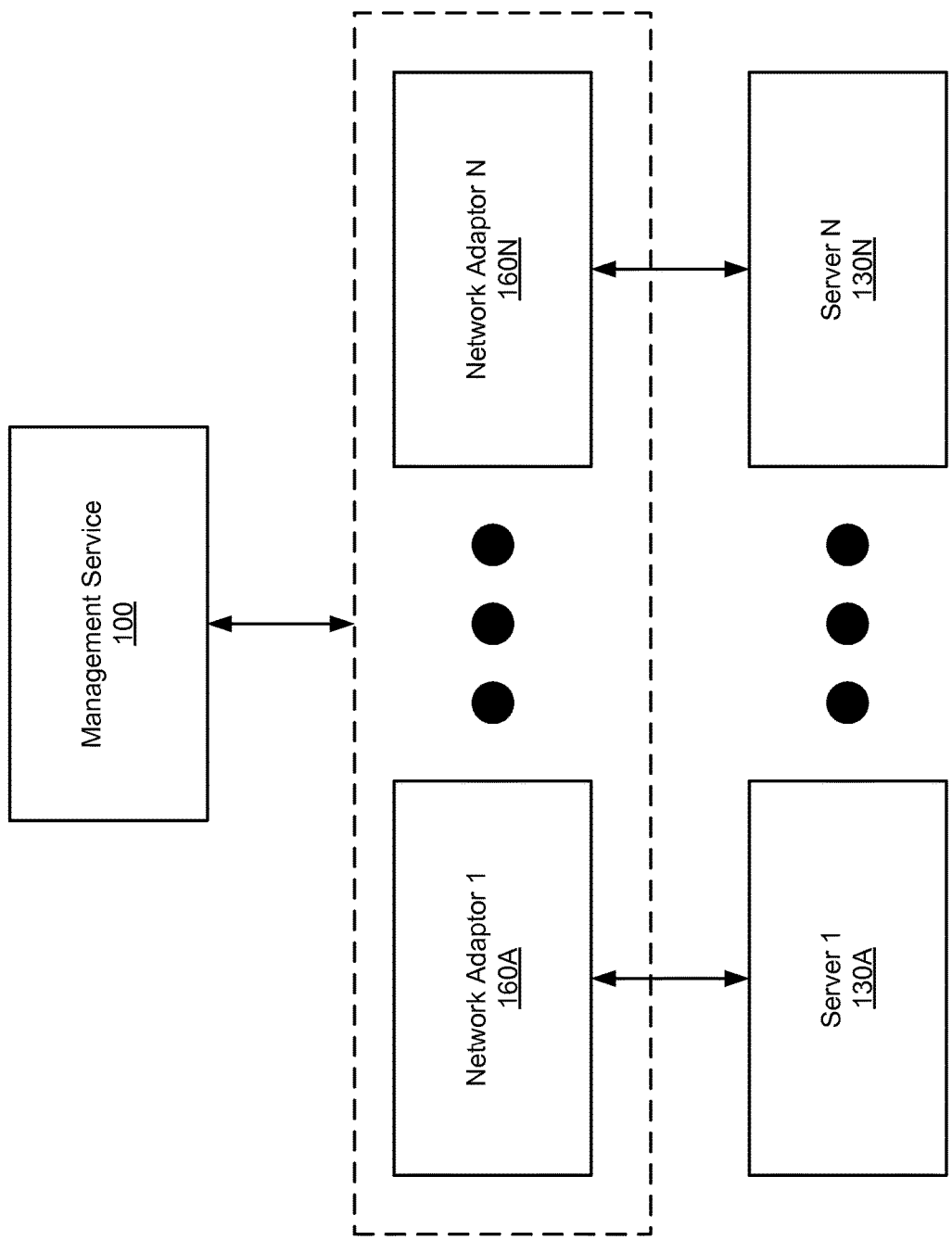
FIG. 2 shows a system in accordance with one or more embodiments of the invention.

FIG. 2 shows an alternate configuration of the system in accordance with one or more embodiments of the invention. In the system shown in FIG. 2, the servers (130A, 130B) and the network adapters (160A, 160B) are physically separate components as opposed to two components located within a single physical system (i.e., in computing device (120)).

Figure 3:
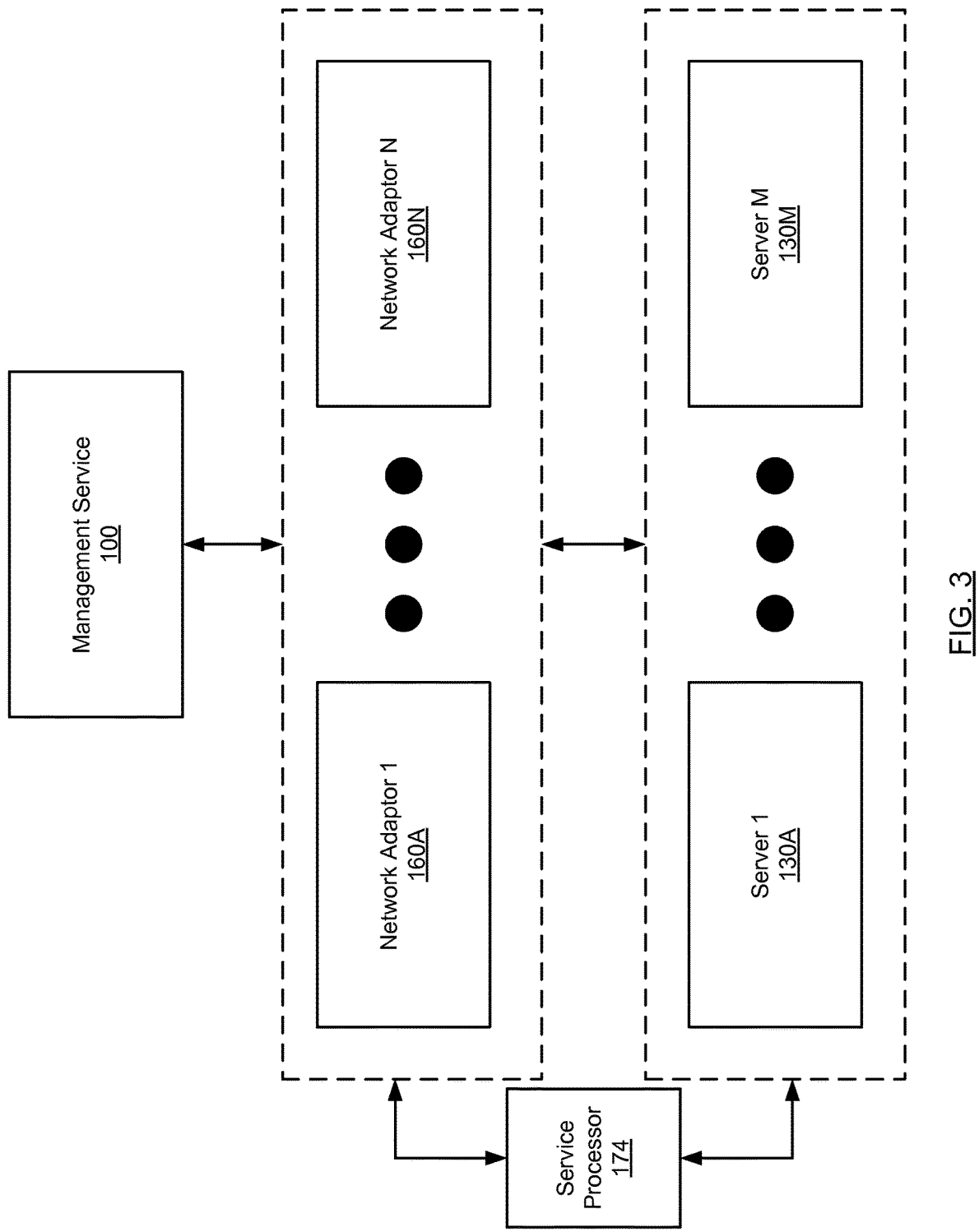
FIG. 3 shows a system in accordance with one or more embodiments of the invention.

FIG. 3 shows an alternate configuration of the system in accordance with one or more embodiments of the invention. In the system shown in FIG. 3, the servers (130A, 130M) and the network adapters (160A, 160N) are physically separate components as opposed to two components located within a single physical system (i.e., in computing device (120)). Further, instead of a 1:1 relationship between servers and network adapters, there may be n:1 relationship between servers and network adapters. In certain scenarios, a single server may be associated with multiple network adapters. The server(s) and the network adapter(s) may be connected via a switching fabric (176). The switching fabric (176) may directly connect the server(s) with the network adapter(s), or it may include network devices (e.g., routers and/or switches) that establish indirect connections between the server(s) and the network adapter(s). In one embodiment of the invention, a service processor (174) may be used to manage the interaction and/mapping between the servers and network adapters i.e., the service processor (174) may assign network adapters (160A-160N) to servers (130A-130N), for example, based on availability, bandwidth and redundancy considerations.

Figure 4:
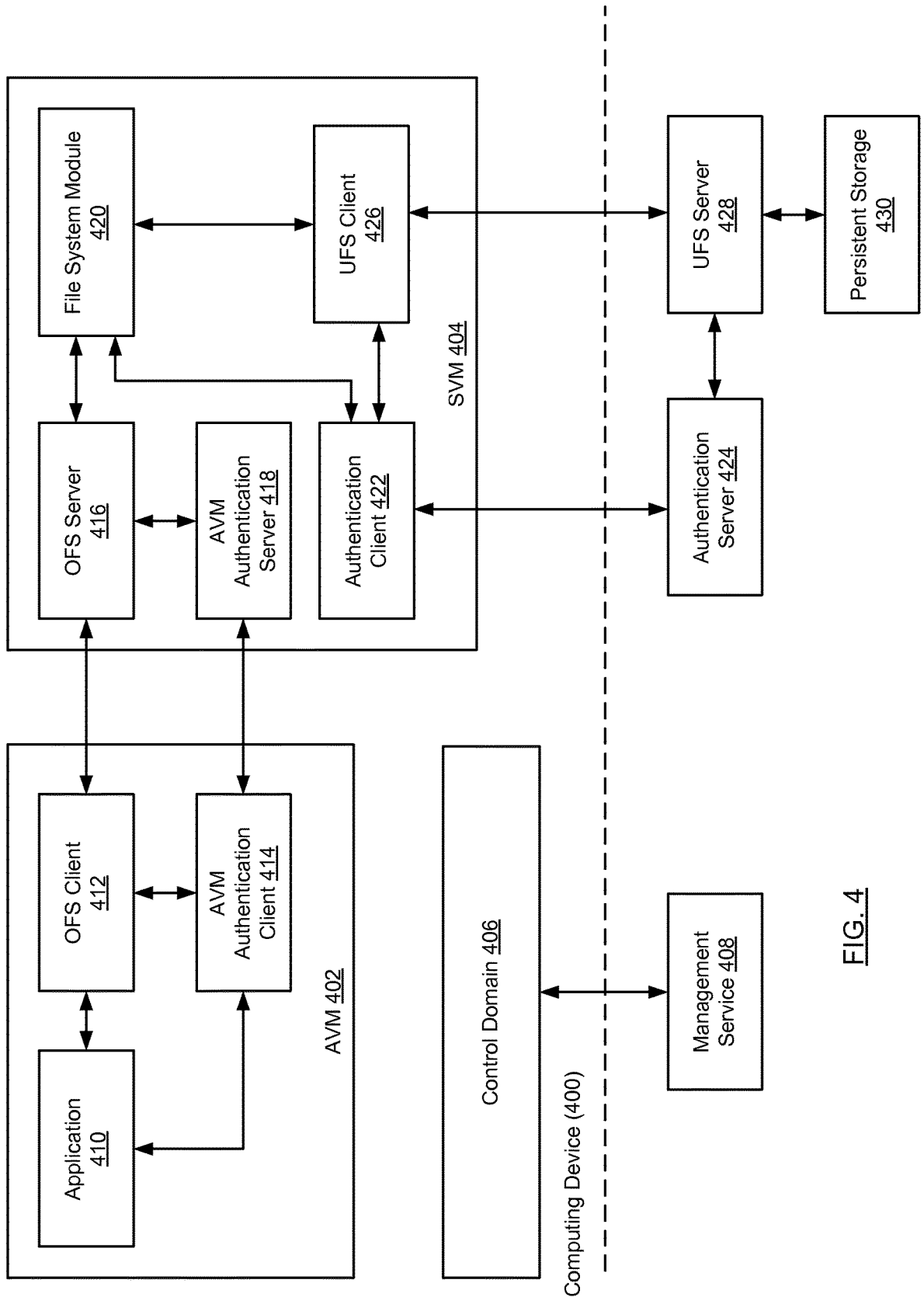
FIG. 4 shows a system in accordance with one or more embodiments of the invention.

In one embodiment of the invention, the application may access data (including metadata) stored in persistent storage, where data in the persistent storage is managed by one or more underlay file systems. FIG. 4 shows one embodiment that enables applications to access data in persistent storage.

Turning to FIG. 4, FIG. 4 shows various components of the system previously described in FIGS. 1A-3 that may be used for managing access to the data within the persistent storage and/or for managing the interaction between the application and the underlay file systems. The other components of the system (while present) are omitted from FIG. 4 for purposes of clarity.

FIG. 4 includes a computing device (400 that includes an application virtual machine (AVM) (402), a service virtual machine (SVM) (404), and a control domain (406). The computing device (400) may communicate (using any wired and/or wireless communication mechanism) with a management service (408), an authentication server (424), and an underlay file system (UFS) server (428). Each of these components is described below.

In one embodiment of the invention, the file system with which the application (410) interacts is referred to as an overlay file system (OFS). Examples of OFSes may include, but are not limited to, Network File System (NFS) version 2 (v2), NFS, v3, and NFSv4. The OFS may be implemented using other file systems without departing from the invention.

The OFS includes two components: an OFS client (412) and an OFS server (416). The OFS client (412) is located in the AVM (typically in the kernel) and includes functionality to: (i) receive OFS operations (described below) from the application (410) and provide the OFS operations to the OFS server (416) executing the in the SVM (404) and (ii) receive OFS responses from the OFS server and provide these OFS responses to the application. In various embodiments of the invention, the OFS client may be configured to interact with the AVM authentication client (414) in order to obtain session tickets (described below) that are required by the OFS in order for the OFS to perform the OFS operation. In such cases, the OFS operation sent to the OFS server may include a session ticket obtained from the AVM authentication client (414).

In one embodiment of the invention, the OFS server (416) is located in the SVM and includes functionality to receive the OFS operation from the OFS client (412), provide the OFS operation to the file system module (420), to receive a corresponding OFS response from the file system module, and to provide the OFS response to the OFS client (412).

In one embodiment of the invention, the AVM authentication client includes functionality to: (i) receive application authentication credentials (e.g., OFS username and password) from OFS client or from the application, (ii) provide the application authentication credentials for the AVM authentication server for verification and (iii) to receive an application session ticket, if the verification is successful, from the AVM authentication server. In one embodiment of the invention, the application session ticket generated by the AVM authentication server may only be used to by the OFS. Said another way, the application session ticket provided by the AVM authentication server cannot be used to access the UFS. Accordingly, if the application (or AVM) is compromised only the application authentication credentials and the application session ticket may be obtained by the malicious party, where the application authentication credentials and the application session ticket cannot be used to access data via the UFS (discussed below). Said another way, the scope of the application authentication credentials provided by the application is the application domain that includes the AVM and the SVM. These application authentication credentials cannot be used for accessing the UFS as the UFS is outside the application domain.

In one embodiment of the invention, the AVM authentication client and AVM authentication server may implemented, for example, using Lightweight Directory Access Protocol (LDAP), Kerberos, or any other access protocol/authentication mechanism.

In one embodiment of the invention, the file system module appears to the OFS server (416). More specifically, the OFS server (416) upon receipt of an OFS operation may issue a system call to a virtual file system (VFS) (not shown). The VFS is kernel-level component in the SVM that provides an interface between the OFS server (416) and the file system module (420). Accordingly, from the perspective of the OFS server (416), the VFS abstracts other file systems with which the OFS server is interacting. In one embodiment of the invention, the file system module is implemented in the kernel level of the SVM. In such cases, the VFS (not shown) directly interfaces with the file system module. In another embodiment of the invention, the file system module is implemented in the user-level of the SVM. In such cases, the VFS communicates with another kernel-level module (not shown) that provides an interface between the VFS and the file system module in the user-level of the SVM.

Figure 6:
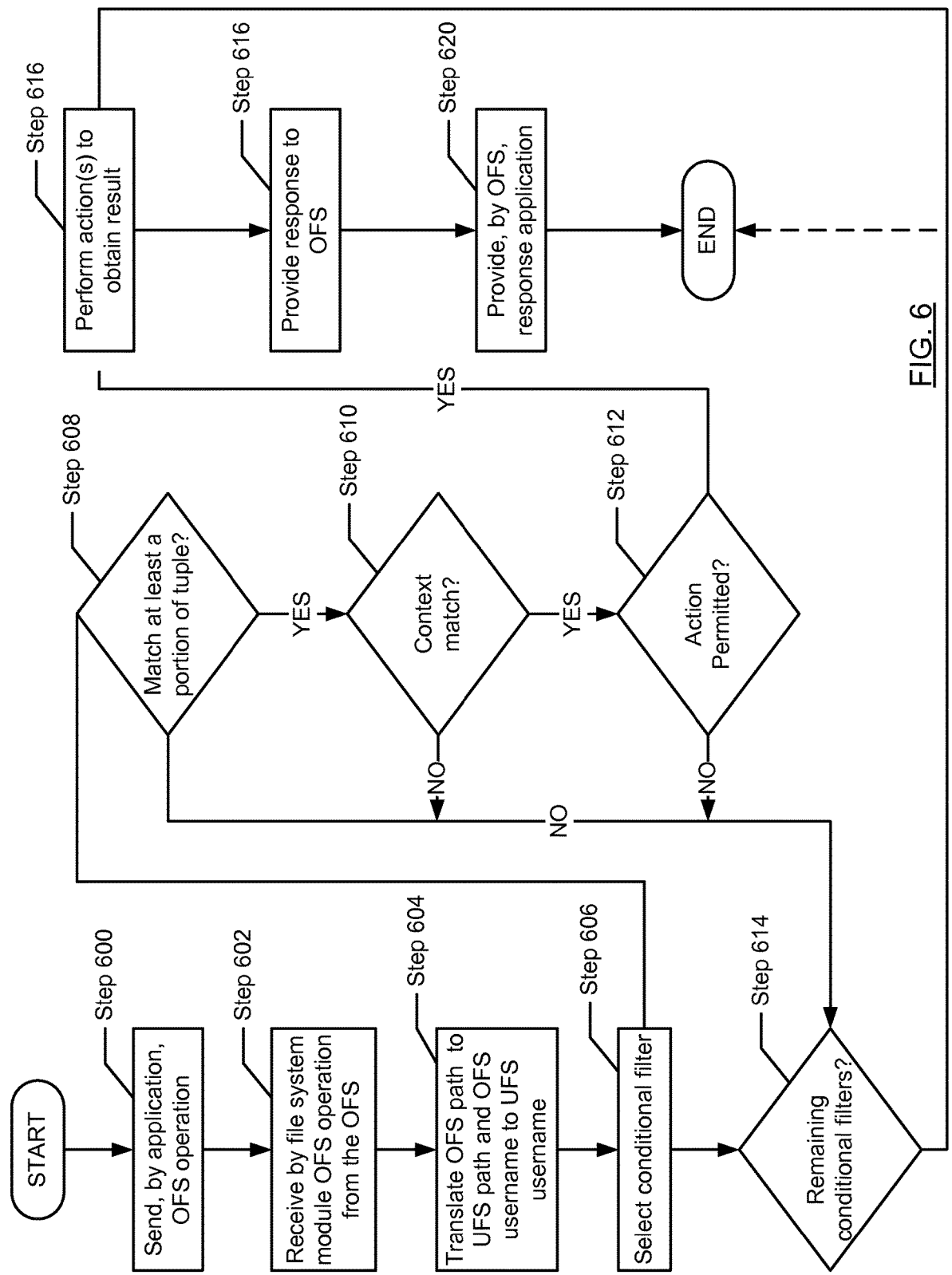
FIG. 6 shows a flowchart for processing overlay file system (OFS) operations in accordance with one or more embodiments of the invention.

In one embodiment of the invention, the file system module includes functionality to receive OFS operations and process the OFS operations in accordance with the method described in FIG. 6.

In one embodiment of the invention, the file system module interacts with the OFS and also with one or more underlay file systems (UFSes). Examples of UFSes may include, but are not limited to, Network File System (NFS) version 2 (v2), NFS, v3, NFSv4, any file system implementing any version of Server Message Block (SMB) protocol, Hadoop Distributed File System (HDFS), any other cloud-based file system. One or more of the UFSes may be implemented using other file systems without departing from the invention.

Continuing with the discussion of FIG. 4, in one embodiment of the invention, each UFS may include a UFS client (see e.g., 426) and a corresponding UFS server (see e.g., 428). As part of the processing in FIG. 6, the file system module may issue one or more UFS operations to one or more UFS clients. In one embodiment of the invention, the file system module may issue a UFS operation to the UFS client via a VFS (not shown) (which may be different than the VFS that is used to facilitate communication between the OFS server and the file system module). In such cases, the file system module may also receive responses from the UFS client via the aforementioned VFS.

The UFS client (426) includes functionality to send the UFS operation to the UFS server (428), to receive a response from the UFS server (428), and provide the response (via a VFS (not shown)) to the UFS client. The UFS server (428) may also include functionality to perform the UFS operation and/or provide the UFS operation to another file system (not shown), where this file system may directly access the data (e.g., files) that are located in the persistent storage (430) (i.e., any type of storage medium that includes functionality to persistently store data). The UFS server (428) may indirectly or directly (depending on the implementation) receive a response (which may or may not include data depending on the UFS operation) and then provide the response to the UFS client.

In one embodiment of the invention, the UFS operation may require a UFS session ticket. In such cases, the file system module provides UFS authentication credentials (UFS username and password) to the UFS client (426) or the authentication client (422). The authentication client (422) forwards a request (that includes the application authentication credentials) to the authentication server (424) (which is external to the computing device). The authentication server subsequently verifies the UFS authentication credentials and then provides a UFS session ticket to the authentication client (422). The authentication client may then provide the UFS session ticket to the UFS client when the UFS client requires the UFS session ticket. In one embodiment of the invention, the authentication client and authentication server may be implemented, for example, using Lightweight Directory Access Protocol (LDAP), Kerberos, or any other access protocol/authentication mechanism.

Figure 5:
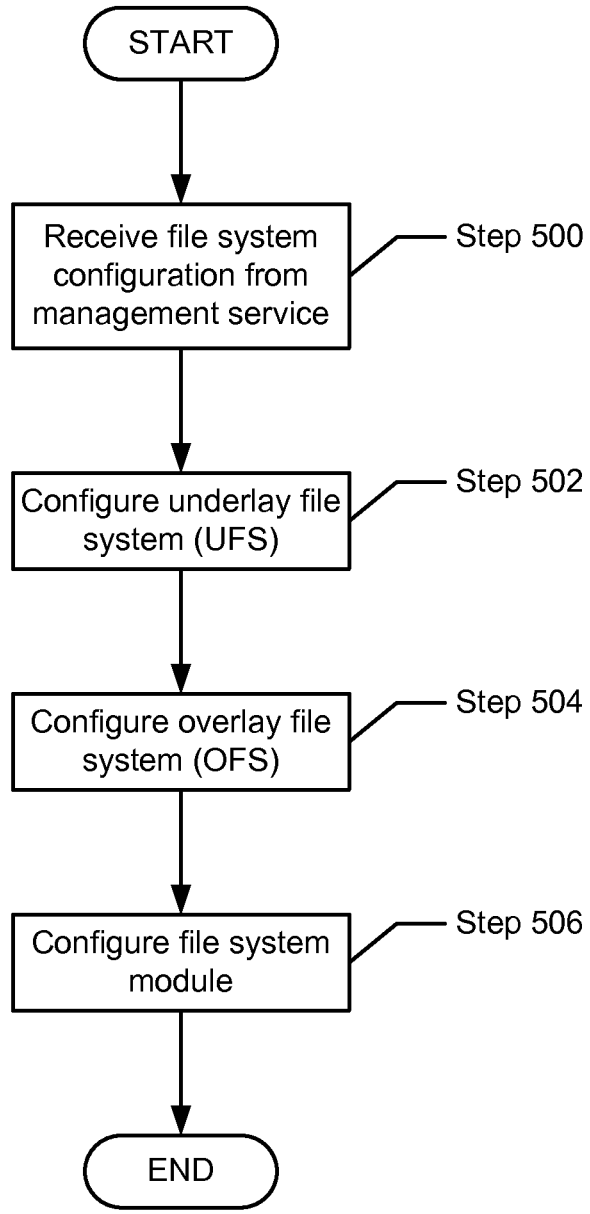
FIG. 5 shows a flowchart for configuring the computing device in accordance with one or more embodiments of the invention.

In one embodiment of the invention, the management service (408) includes functionality to provide the information necessary to configure the OFS, UFS, and the file system module (see e.g., FIG. 5).

While the system show in FIG. 4 includes a single UFS and the single OFS, embodiments of the invention may be implemented that include multiple UFSes mapped to a single OFS and/or multiple OFSes may be mapped to a single UFS. Further, while the system shows a single file system module, a given computing device may include a file system module for each AVM. Alternatively, the computing device may include a single file system module for each application sandbox (see e.g., FIG. 1C). In another embodiment of the invention, a single file system module may be interacting with multiple OFSes and/or multiple UFSes.

In one embodiment of the invention, the AVM authentication client (414) may be part of the OFS client (414) and the AVM authentication server (418) may be part of the OFS server (416). In such scenarios, the application may provide the application authentication credentials directly to the OFS client.

In one embodiment of the invention, the authentication client (422) may be part of the UFS client (426) and the authentication server (424) may be part of the UFS server (428). In such scenarios, the file system module may provide the UFS authentication credentials directly to the UFS client.

FIGS. 5 and 6 show flowcharts in accordance with one or more embodiments of the invention. While the various steps in the flowcharts are presented and described sequentially, one of ordinary skill will appreciate that some or all of these steps may be executed in different orders, may be combined or omitted, and some or all of the steps may be executed in parallel.

Turning to FIG. 5, FIG. 5 shows a method for configuring the computing device in accordance with one or more embodiments of the invention. In step 500, the management service sends file system configuration information to the computing device. The configuration information may include information that is used to perform the initial configuration of the OFS, the UFS, and the file system module. The specific information that is conveyed via the configuration information may vary based on the implementation of the invention.

In one embodiment of the invention, the configuration information may also include the information necessary to perform the methods in FIG. 6.

In one embodiment of the invention, the configuration information includes application authentication credentials for one or more OFSes and the UFS authentication credentials for one or more UFSes.

In embodiment of the invention, the configuration information may specify the UFS to OFS mappings. The mappings may be n:1, 1:1, and/or 1:m. In one embodiment of the invention, the names of the OFS mount points that are used in the mapping may be different than the UFS root paths that are being mounted. The names of the mount points in the OFS may be provided the management service. Further, the names of the OFS mount points may be selected in a manner that does not convey the structure/organization of the data maintained by the UFS. The following section describes an example of each of the aforementioned mapping options.

Example 1—n:1 Mapping

In this example, n different UFS root paths may be mapped to a single OFS mount point. For example, the UFS may have the following three UFS root paths: (i) UFS://var/log; (ii) UFS://usr/bin; and (iii) UFS://home/john. These three UFS root paths may be mapping to a single OFS mount point as follows: OFS://mnt/log; OFS://mnt/bin; and OFS://mnt/john.

Example 2—1:1 Mapping

In this example, there is a single UFS root path for each OFS mount point. For example, UFS://var/log may be mounted in the OFS as OFS://mnt/log.

Example 3—1:m Mapping

In this example, there is a single UFS root path is visible to the OFS as multiple distinct mount points. For example, the UFS root path UFS://home/john may include subdirectories /config and /db. Further, the subdirectory /db may include a subdirectory /logs. The three aforementioned directories/subdirectories may be mounted to three different OFS mount points as follows: OFS://mnt/db (excluding the/logs subdirectory), OFS://mnt/logs, and OFS://mnt/config.

The configuration information may also include information necessary to implement the method shown in FIG. 6.

The configuration information listed above may all be provided to the computing device prior to any configuration of the OFS, UFS, and file system module. In another embodiment of the invention, the configuration information may be provided (or otherwise obtained) as it is need by the computing device.

In step 502, the UFS is configured. The configuration of the UFS may not require any of the aforementioned configuration information from the UFS. In particular, the UFS may be installed and configured prior to the receipt of the configuration information. In another embodiment of the invention, the configuration information may include the binary for the UFS client and also include information to configure the UFS client to interact with the authentication client in the control domain. In such cases, step 502 may include the installation and configuration of the UFS client.

In step 504, the OFS is configured. The configuration of the OFS may not require any of the aforementioned configuration information from the OFS. In particular, the OFS may be configured prior to the receipt of the configuration information. In another embodiment of the invention, the configuration information may include the binary for the OFS client and the binary for the OFS server, and may also include information to configure the OFS client to interact with the AVM authentication client. In such cases, the step 504 may include the installation and configuration of the OFS client (including configuration of the OFS client to interact with the AVM authentication client) and the OFS server.

In step 506, the file system module is configured. In one embodiment of the invention, configuration of the file system module may include installation of the file system module, configuration of the file system module to interact with the OFS server and configuration of the file system to interact with the UFS client(s). Configuration of the file system to interact with the OFS server may include exporting various file system paths to the OFS such that the OFS may mount these paths. The paths that are exported by the file system module may be defined by the management service and provided to the computing device via the configuration information as described in step 502.

In one embodiment of the invention, step 506 may include performing one or more mounting operations by the file system module. Further, step 506 may include performing one or more mounting operations by the OFS.

In one embodiment of the invention, the mount operation by a file module may include: (i) sending, by the file system module, a mount operation request to the UFS client; (ii) sending, by the UFS client, a request for a session ticket to the authentication client; (iii) sending, by the authentication client, a request for UFS authentication credentials to the file system module; (iv) receiving, by the authentication client, the UFS authentication credentials from the file system module; (v) providing, by the authentication client, the UFS credentials to the authentication server; (vi) generating, by the authentication server, a UFS session ticket after verifying the UFS authentication credentials; (vii) sending, by the authentication server, the UFS session ticket to the UFS server and the authentication client; (viii) providing, by the authentication client, the UFS session ticket to the UFS client; (ix) sending, by the UFS client, the mount operation request and the UFS session ticket to the UFS server; (x) verifying, by the UFS server, the UFS session ticket and, based on the verification, performing the mount operation.

In embodiment of the invention, the mount operation by a OFS include: (i) sending, by the application, a mount operation request to the OFS client; (ii) sending, by the OFS client, a request for a session ticket to the AVM authentication client; (iii) sending, by the AVM authentication client, a request for application authentication credentials to the application; (iv) receiving, by the AVM authentication client, the application authentication credentials from the application; (v) providing, by the AVM authentication client, the application credentials to the AVM authentication server; (vi) generating, by the AVM authentication server, an application session ticket after verifying the application authentication credentials; (vii) sending, by the AVM authentication server, the application session ticket to the OFS server and the AVM authentication client; (viii) providing, by the AVM authentication client, the application session ticket to the OFS client; (ix) sending, by the OFS client, the mount operation request and the application session ticket to the OFS server; (x) verifying, by the OFS server, the application session ticket and, based on the verification, performing the mount operation.

Other methods for performing the aforementioned mount operations may be performed without departing from the invention.

At this stage, the application, which is configured to interact with the OFS client, is able to send OFS operations (discussed below). Said another way, at this stage, the application is able to interact with the OFS, where the OFS appears to the application as a local file system with which it is interacting.

While FIG. 5 describes one embodiment for setting up the OFS, UFS, and the file system module other methods for configuration the aforementioned components may be implemented without departing from the invention. Further, while the configuration of the file system module may include populating the file system module with some initial conditional filters, resource object action permissions, and policies, the management service may dynamically change, add or remove, and of the conditional filters, resource object action permissions, and/or policies at any point during the operation of the file system module.

FIG. 6 shows a flowchart for processing overlay file system (OFS) operations in accordance with one or more embodiments of the invention.

In step 600, the application issues (or sends) an OFS operation. In one embodiment of the invention, the OFS operation includes a trigger event, an OFS path, and specifies an OFS user (i.e., the username that the application is using to interact with the OFS). The trigger event may include any operation that may be performed by the OFS. Examples of trigger events may include, but are not limited to, initialize/load OFS, destroy/close OFS, get attribute of a resource object in the OFS, open directory, read directory, close directory, create directory, delete directory, rename resource object in OFS, create file, delete file, open file, read file, write file, link, symlink, change permissions for a resource object, change owner/group of resource object, and/or mknod. The OFS operation may include other trigger events without departing from the invention. The OFS path is the OFS file system path for the resource object, i.e., the file(s) or directory(ies)) that is associated with the trigger event. In one embodiment of the invention, the OFS operation may optionally include data that is to be written as part of the OFS operation.

In step 602, the OFS operation is received by the file system module from the OFS (or, more specifically, from the OFS server). In one embodiment of the invention, the OFS operation issued by the application may be modified by the OFS client to include a session ticket (discussed above). In such scenarios, the session ticket is used by the OFS server to authenticate the application (or the user of the application) that sent the OFS operation. If the authentication is successful, then OFS server forwards the request to the file system module; otherwise the process ends. Though not shown in FIG. 6, if the authentication fails then the OFS server may provide a response to the application indicating that the authentication has failed.

In step 604, the OFS path in the OFS operation is translated to a corresponding path in the UFS (i.e., a UFS path) and the OFS user (i.e., a username in the application authentication credentials) is translated to a UFS user (i.e., a username used in the UFS authentication credentials). As discussed above, the directories in the OFS may have different names than the corresponding paths in the UFS with which they are associated. Further, the name associated with a file in the OFS may be also different than the actual name of the file in the UFS. The following is a non-limiting example of a translation that may be performed in step 604. Consider a scenario in which the OFS has the following directory: OFS://tmp/dir2 and the user of the application issues a "ls" command to read the content of the directory to obtain a listing. The OFS operation may be as follows: "OFS://tmp/dir2$ ls". When the aforementioned OFS operation is received by the file system module, the file system module may first determine whether the path in the OFS operation (i.e., does "OFS://tmp/dir2") needs to be translated to the corresponding directory in the UFS. In this example, a translation is required and the corresponding UFS path is "UFS://mnt/work/unclassified". In one embodiment of the invention, the file system module includes the information necessary to perform the aforementioned translation(s).

In addition, the OFS username and the UFS username may be different. More specifically, the application may be provided with a mock username (also referred to an OFS username) for purposes of authenticating with the OFS. However, a different username (i.e., the UFS username) may be used by the file system module to access the UFS. For example, the application may be provided with an OFS username of "Bob_1" and the corresponding UFS username may be "UserID_1725". In such cases, the file system module includes functionality and the appropriate information to perform the aforementioned translation of the OFS username to UFS username.

At this stage, a tuple is generated that includes the following information: <OFS path, UFS path, OFS username, UFS username, trigger event>. This tuple is then used to identify a policy. More specifically, the file system module includes a set of conditional filters where each conditional filter is associated with a policy. The file system module includes functionality to determine which (if any) of the conditional filters match all or a portion of the aforementioned tuple. In one embodiment of the invention, the conditional filters may be applied sequentially to the above tuple until one the following three conditions is satisfied: (i) an exact match is found; (ii) a partial match is found (if not exact match is found); and (iii) no match exact or partial match is found. The aforementioned matching processing may be performed until at least one of the three conditions is satisfied. In one embodiment of the invention, the matching process stops when any of the three aforementioned conditions is satisfied. In such cases, the conditional filters are applied from the most specific to the most generic conditional filter. In another embodiment of the invention, all conditional filters are applied to the tuple and conditional filter with the best match for the tuple is selected.

In one embodiment of the invention, the conditional filters each include at least one regular expression. The following are examples of the possible types of conditional filters. The examples are not intended to limit the scope of the invention.

EXAMPLE CONDITIONAL FILTER TYPES

Type 1—match to a specific file name in a specific directory in either OFS path or the UFS path.

Type 2—match to a specific file name in any OFS or UFS path.

Type 3—match to a directory (in OFS path or UFS path) where a specific file exists.

Type 4—match to a directory (in the OFS path or UFS path) that has been modified within a certain time range.

Type 5—match to a directory (in the OFS path or the UFS path) that is at least a given size.

Regardless of how the conditional filters are evaluated, the result of the matching process, (see e.g., steps 606-614 below), is an identification of conditional filter (i.e., the tuple matches the conditional filter; said another, the result of applying the conditional filter to the tuple returns TRUE, where TRUE may be an exact match or a partial match).

In the event that the evaluation of the tuple with the conditional filters does not result in any sort of match, then one of two scenarios may occur: (i) a default conditional filter is identified and used to the process the OFS operation and (ii) the OFS operation is denied.

Continuing with the discussion of FIG. 6, in step 606, a conditional filter from the set of conditional filters is selected. In step 608, a determination is made about whether at least a portion of the tuple matches the conditional filter (e.g., the conditional filter matches the OFS path and the UFS username). If there is at least a partial match, then the process proceeds to step 610; otherwise the process proceeds to step 614.

In step 610, a determination is made about whether there is a context match. More specifically, the current context of the OFS operation is obtained. The current context may be the time of the request, the type of resource object (e.g., a file or directory being request), the physical location of the resource object being requested (e.g., located in a back-up storage device), etc. The invention is not limited to the aforementioned examples. If the current context of the OFS operation is not within the allowed context, then the process proceeds to step 614; otherwise, the process proceeds to step 612.

In step 612, a determination must be made about whether the action (i.e., the action specified in the policy that is associated with the selected conditional filter) can be performed on the resource object that is the subject of the OFS operation. More specifically, the resource object (i.e., a file or directory) that is the subject of the OFS operation is determined using the OFS path or UFS path. The action permission for the resource object is then obtained by the file system module for the particular action in the policy. Said another way, the resource object may be associated with different action permissions where there is a different action permission for each action that may be performed on the resource object. In one embodiment of the invention, the action permissions for a given resource object may be stored as set of tuples that include <resource object, action, action permission>.

The action permission for a given <resource object, action> pair may be explicitly set as allow, deny, or unspecified. If the resource object is a directory, then the resource object may also specify action permissions for its child resource objects (e.g., sub directories and files stored in the directory). The possible action permissions for the child resource objects may be allow by default, deny, deny by default, and unspecified.

In order to determine the action permission for a given <resource object, action> pair, the corresponding action permissions for the resource object and the corresponding child object action permissions from the parent resource object are obtained. If the child object action permission from the parent resource object is unspecified and the parent resource objects action permission is unspecified, then the parent resource object's action permission must be determined by recursively obtaining action permissions in its ancestor resource objects until such time as the action permission of the parent resource object can be determined, the resource action permission for the parent resource object may then be used to determine the child action permission for child resource objects of the parent resource object.

Once the action permission for the resource object and the child action permission from the parent resource object are determined, then the effective action permission for the resource object may be determined. The following table provides an example of how two aforementioned action permissions may be used to determine the effective action permission for the resource object.

TABLE 1

Action Permission Resolution

| Resource Object Action Permission | Effective Child Resource Action Permission from Parent Resource Object | Effective Resource Object Action Permission |
|---|---|---|
| Unspecified | Deny | Deny |
| Deny | Deny | Deny |
| Allow | Deny | Deny |
| Unspecified | Allow by Default | Allow |
| Deny | Allow by Default | Allow |
| Allow | Allow by Default | Deny |
| Unspecified | Deny by Default | Deny |
| Deny | Deny by Default | Allow |
| Allow | Deny by Default | Deny |

The following examples illustrate how an action permission may be determined for a resource object. The examples are not intended to limit the invention.

Example 1

In this example, the resource object is a file foo.txt specified at the following path, UFS://john/home/foo.txt. Further, in this example, the action permission for foo.txt is unspecified, the child resource object action permission specified in the parent resource object (i.e., UFS://john/home) is unspecified, and the action permission for the parent resource object is deny. Accordingly, the effective child resource object action permission from the parent resource object is deny (i.e., the action permission is inherited from the parent resource object). Based on Table 1, the effective permission for the resource object is deny because the resource object's action permission is unspecified, and the effective child resource object's action permission from the parent resource object is deny.

Example 2

In this example, the resource object is a file foo.txt specified at the following path, UFS://john/home/foo.txt. Further, in this example, the action permission for foo.txt is allowed, the child resource object action permission specified in the parent resource object (i.e., UFS://john/home) is unspecified, and the action permission for the parent resource object is unspecified. In order to determine the parent resource object's action permission, the child resource object action permission specified in UFS://john is obtained. In this example, the child resource object action permission is deny.

Accordingly, the action permission for the parent resource object is also deny because parent resource object's action permission is unspecified, and the effective child resource object's action permission from the its parent resource object (i.e., UFS://john) is deny. Further, the effective child resource object action permission from the parent resource object is deny (i.e., the action permission is inherited from the parent resource object). Based on Table 1, the effective action permission for the resource object is deny because the resource object's action permission is allow, and the effective child resource object's action permission from the parent resource object is deny.

If the result of evaluating the action permission for the <resource object, action> pair is deny, then the process proceeds to step 614; otherwise, the process proceeds to step 616. In step 614, a determination is made about whether there are additional conditional filters to apply to the tuple. If there are additional filters to apply, then the process proceeds to step 606; otherwise, the process may end if there are no other conditional filters to evaluate and the file system module is configured to deny the OFS operation if there are no matching conditional filters or, alternatively, the process proceeds to step 616 to perform an action in a policy that is associated with a default conditional filter. Though not shown in FIG. 6, if the OFS operation is not permitted (as a result of the determination in step 614), the file system module may (via to OFS client) may provide a response to the application indicating that the OFS operation is not permitted (or that the OFS operation failed).

In step 616, the action(s) in the policy associated the identified conditional filter is performed. The particular action(s) to be performed may vary from policy to policy. In one embodiment of the invention, performing the action(s) may include generating a UFS operation that includes the UFS path (determined in step 604) a trigger event (which may need to be translated from an OFS trigger event to a UFS trigger event), and a UFS username. The UFS client may obtain an appropriate UFS session ticket from the authentication client to include with the UFS operation prior to sending the UFS operation to the UFS server. The UFS operation may then be issued to the UFS (i.e., to the UFS client). A response may subsequently be obtained from the UFS. The response may include, for example, a file, metadata for a file, a listing of directory context, a notification that the UFS operation was successfully, and a notification that the UFS operation was unsuccessful.

The response from the UFS may then be modified to generate a response (an OFS response) that may be sent to the application via the OFS. The modifications, if any, may be specified as actions within the policy. For example, the policy may include actions to perform one or more of the following on the response received from the UFS: (i) modify metadata for a file (e.g., modify the name of the file, modify a creation date of the file, modifying a modification date of the file, modify a size of the file, modifying an action permission associated with the file, etc.), (ii) modify metadata for a directory (e.g., modify the name of the directory, modify a creation date of the directory, modify a modification date of the directory, modify a size of the directory, modify an action permission associated with the directory, etc.), (iii) modify the format of a file (e.g., change the format from text to portable document format (PDF), encrypt the file, decrypt the file, etc.), (iv) modify the content of a file (e.g., remove sensitive content from a file, redact content in the file, add content to the file, replace content in the file, etc.), (v) change the UFS path in the UFS response to an OFS path, (vi) create a log file that includes all OFS operations, all operations/functions performed by the file system module to perform the action associated with the policy including all UFS operation issued to the UFS and all responses returned from the UFS, and (vii) cache a copy of the response from the UFS in the SVM and/or cache a copy of the OFS response generated as result of step 612. The invention is not limited to the aforementioned actions.

Regardless of the specific action(s) performed by the file system module on the response from the UFS. The result of step 616 is a result (also referred to as an OFS response).

In step 616, the OFS response is sent to the OFS. In step 618, the OFS provides a response to the application.

In one embodiment of the invention, the OFS operation may result in the generation of multiple UFS operations. In such, cases the responses returned for the UFS for each of the issued UFS operations may each be processed as described in step 616. The results of the individual processing may be combined into a single OFS response, which may be sent to the OFS in step 616.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the technology.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing overlay file system (OFS) operations, the method comprising:

receiving an OFS operation, by a file system module, executing in a service virtual machine (SVM), from an application executing in an application virtual machine (AVM), via an OFS client and an OFS server that authenticates the OFS operation based on an application session ticket, wherein the OFS operation comprises a trigger event, an OFS path, and an OFS username, wherein the file system module provides the application with access to one or more resources that are managed by the SVM based on a plurality of policies;

generating, by the file system module, an underlay file system (UFS) operation and providing the UFS operation with a UFS session ticket to a UFS client executing on the SVM, wherein the UFS operation is to access a resource from among the one or more resources to provide a response to the OFS operation;

determining, by the file system module, whether the OFS path needs to be translated to an UFS path, wherein the UFS path corresponds to the resources among the one or more resources;

based on determining that the OFS path needs to be translated to the UFS path, translating, by the file system module, the OFS path to the UFS path;

translating, by the file system module, the OFS username to a UFS username;

identifying, by the file system module, a conditional filter that matches a tuple comprising the OFS path, the UFS path, the UFS username, and the trigger event;

obtaining, by the file system module, a policy among the plurality of policies using the conditional filter;

applying, by the file system module, the policy to the OFS operation in order to generate a response; and providing, by the file system module, the response to the application, wherein the OFS comprises the OFS client and the OFS server, wherein the OFS client is executing in the AVM and the OFS server is executing in the SVM, and wherein the SVM and the AVM are located in a computing device.

2. The method of claim 1, wherein translating the OFS path to the UFS path comprises changing at least one selected from a group consisting of a file name in the OFS path and a directory name in the OFS path.

3. The method of claim 1, wherein identifying the conditional filter comprises:
determining a resource object associated with the OFS operation;
obtaining an action permission associated with the resource object; and
identifying the conditional filter based, at least in part, on evaluating the action permission.

4. The method of claim 3, wherein obtaining the action permission comprises:
making a determination that the action permission for the resource object is unspecified;
based on the determination, obtaining the action permission from a parent resource object of the resource object; and
determining the action permission for the resource object based at least on the action permission from the parent resource object.

5. The method of claim 4, wherein the resource object is a file and the parent resource object is a directory.

6. The method of claim 4, wherein the resource object is a first directory and the parent resource object is a second directory, wherein the first directory is a subdirectory of the second directory.

7. The method of claim 1, wherein applying the policy to the OFS operation comprises:
issuing the UFS operation to the UFS, wherein the UFS operation includes the UFS path;
receiving a file in response to the UFS operation; and
modifying at least a portion of the file to obtain a modified file,
wherein the response comprises the modified file,
wherein the UFS comprises the UFS client located in the SVM,
wherein the UFS client is operatively connected to a persistent storage comprising the file, and
wherein the persistent storage is external to the computing device.

8. The method of claim 7, wherein modifying at least the &-portion of the file comprises modifying at least a portion of metadata for the file and modifying content in the file.

9. The method of claim 8, wherein the metadata comprises at least one selected from a group consisting of a file name of the file, a creation date of the file, a modification date of the file, a size of the file, and an access permission associated with the file.

10. The method of claim 8, wherein modifying the content of the file comprises at least one selected from a group consisting of adding new content to the content of the file, removing at least a portion of the content from the file, replacing at least a portion of the content from the file, changing a format of the file, encrypting the content of the file, and decrypting the content of the file.

11. The method of claim 7, wherein receiving the OFS operation includes receiving the OFS operation and the application session ticket from the OFS client that obtained the application session ticket based on first authentication credentials of the application being authenticated by a first authentication server, and wherein generating the UFS operation includes authenticating, by the file system module, the UFS operation by providing second authentication credentials of the UFS to a second authentication server to obtain the UFS session ticket.

12. The method of claim 1, wherein the conditional filter comprises a regular expression, wherein the conditional filter is one of a plurality of conditions conditional filters that match the tuple, and wherein the conditional filter provides a best match to the tuple.

13. The method of claim 1, wherein the trigger event comprises at least one selected from a group consisting of open a directory, read the directory, close the directory, create the directory, delete the directory, create a file, delete the file, open the file, read the file, and write to the file.

14. A non-transitory computer readable medium comprising computer readable program code, which when executed by a computer processor enables the computer processor to perform a method for processing overlay file system (OFS) operations, the method comprising:
receiving an OFS operation by a file system module executing in a service virtual machine (SVM), from an application executing in an application virtual machine (AVM), via an OFS client and an OFS server that authenticates the OFS operation based on an application session ticket, wherein the OFS operation comprises a trigger event, an OFS path, and an OFS username;

generating, by the file system module, an underlay file system (UFS) operation and providing the UFS operation with a UFS session ticket to a UFS client executing on the SVM, wherein the UFS operation is to access a resource from among one or more resources to provide a response to the OFS operation;

determining, by the file system module, whether the OFS path needs to be translated to an UFS path, wherein the UFS path corresponds to the resources among the one or more resources;

based on determining that the OFS path needs to be translated to the UFS path, translating, by the file system module, the OFS path to the UFS path;

translating, by the file system module, the OFS username to a UFS username;

identifying, by the file system module, a conditional filter that matches a tuple comprising the OFS path, the UFS path, the UFS username, and the trigger event;

obtaining, by the file system module, a policy using the conditional filter;

applying, by the file system module, the policy to the OFS operation in order to generate a response; and providing, by the file system module, the response to the application, wherein the OFS comprises the OFS client and the OFS server, wherein the OFS client is executing in the AVM and the OFS server is executing in the SVM, and wherein the SVM and the AVM are located in a computing device.

15. The non-transitory computer readable medium of claim 14, wherein translating the OFS path to the UFS path comprising changing at least one selected from a group consisting of a file name in the OFS path and a directory name in the OFS path.

16. The non-transitory computer readable medium of claim 14, wherein identifying the conditional filter comprises:

determining a resource object associated with the OFS operation, wherein the resource object is one selected from a group consisting of a directory and a file;

obtaining an action permission associated with the resource object; and identifying the conditional filter based, at least in part, on evaluating the action permission.

17. The non-transitory computer readable medium of claim 16, wherein obtaining the action permission comprises:

making a determination that the action permission for the resource object is unspecified;

based on the determination, obtaining the action permission from a parent resource object of the resource object; and determining the action permission for the resource object based at least on the action permission from the parent resource object.

18. The non-transitory computer readable medium of claim 14, wherein applying the policy to the OFS operation comprises:

issuing the UFS operation to the UFS, wherein the UFS operation includes the UFS path;

receiving a file in response to the UFS operation; and modifying at least a portion of the file to obtain a modified file, wherein modifying at least the portion of the file comprises modified at least a portion of metadata for the file and modifying content in the file, wherein the response comprises the modified file, wherein the UFS comprises the UFS client located in the SVM, wherein the UFS client is operatively connected to a persistent storage comprising the file, and wherein the persistent storage is external to the computing device.

19. The method of claim 1, wherein the tuple further comprises the OFS username, and further comprising applying to the tuple a plurality of conditional filters corresponding to the plurality of policies, the plurality of conditional filters being applied sequentially from a more specific conditional filter to a more generic conditional filter.

20. A method for processing overlay file system (OFS) operations, the method comprising:

receiving an OFS operation, by a file system module, executing in a service virtual machine (SVM), from an application executing in an application virtual machine (AVM), via an OFS client and an OFS server that authenticates the OFS operation based on an application session ticket, wherein the OFS operation comprises a trigger event, an OFS path, and an OFS username, wherein the file system module provides the application with access to one or more resources that are managed by the SVM based on a plurality of policies;

translating, by the file system module, the OFS path to a UFS path, wherein the UFS path corresponds to a resource among the one or more resources;

translating, by the file system module, the OFS username to a UFS username;

identifying, by the file system module, a conditional filter that matches a tuple comprising the OFS path, the UFS path, the UFS username, and the trigger event;

obtaining, by the file system module, a policy among the plurality of policies using the conditional filter;

applying, by the file system module, the policy to the OFS operation in order to generate a response; and providing, by the file system module, the response to the application, wherein the OFS comprises the OFS client and the OFS server, the OFS client is executing in the AVM and the OFS server is executing in the SVM, and the SVM and the AVM reside in a computing device, and wherein identifying the conditional filter includes:

identifying a default conditional filter based on the tuple not matching any of available conditional filters.

* * * * *

UNITED STATES PATENT AND TRADEMARK OFFICE
CERTIFICATE OF CORRECTION

PATENT NO. : 10,803,027 B1
APPLICATION NO. : 14/705539
DATED : October 13, 2020
INVENTOR(S) : Robert Stephen Rodgers et al.

It is certified that error appears in the above-identified patent and that said Letters Patent is hereby corrected as shown below:

In the Claims

Claim 8, Column 20, Line 5-6, please replace "at least the & portion of the file" with --at least the portion of the file--

Claim 12, Column 20, Line 33, please replace "plurality of conditions conditional filters" with --plurality of conditional filters--

Claim 14, Column 20, Line 51-53, please replace "and an OFS username; generating," with --and an OFS username, wherein the file system module provides the application with access to one or more resources that are managed by the SVM; generating,--

Signed and Sealed this
Third Day of May, 2022

Katherine Kelly Vidal
*Director of the United States Patent and Trademark Office*